July 15, 1941.  W. H. HARSTICK  2,249,653
CREAM SEPARATOR BOWL
Filed Aug. 13, 1937
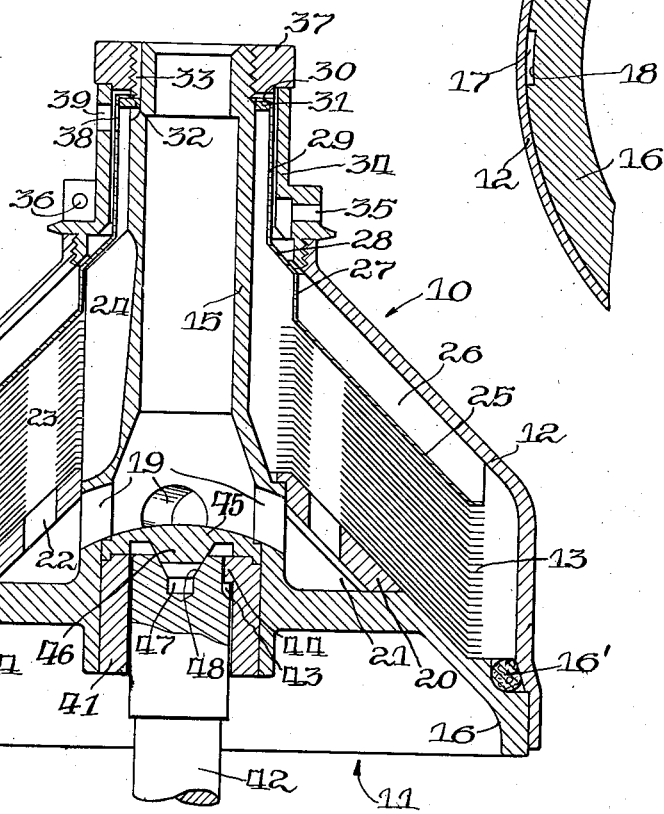
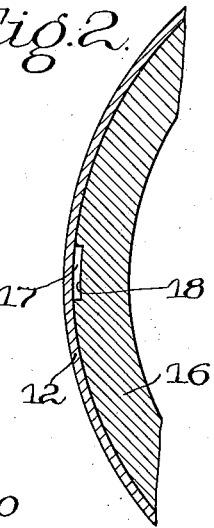
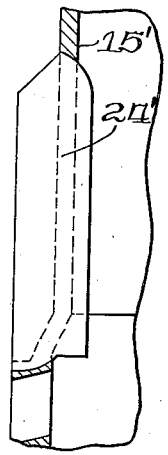
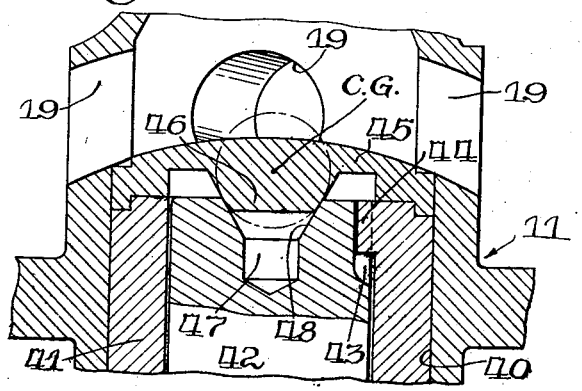
Inventor
William H. Harstick.
By V. F. Larreque
Att'y.

Patented July 15, 1941

2,249,653

UNITED STATES PATENT OFFICE 2,249,653

CREAM SEPARATOR BOWL

William H. Harstick, Milwaukee, Wis., assignor to International Harvester Company, a corporation of New Jersey Application August 13, 1937, Serial No. 158,901

2 Claims. (Cl. 233—29)

This invention relates to a cream separator bowl assembly, and more particularly to the way in which the assembly is mounted upon the bowl spindle.

The main object of the invention is to provide a low pivot point in an assembly pivoted about its center of gravity, so that the whole milk may be fed to the under side of the separator disks in the assembly without the use of an auxiliary sleeve. On a conventional cream separator bowl assembly, which is pivoted about its center of gravity, an auxiliary sleeve is used because the pivot point is above the center of gravity and consequently well above the under side of the disks. According to this invention the pivot point is brought below the center of gravity. Thus, the center of the bowl member may be lowered and access may be had to the under side of the disks without the use of an auxiliary sleeve. With the elimination of the auxiliary sleeve, more cream space is provided.

A further object of the invention is the provision of a locating lug on the bowl shell for fastening the shell to the bowl member.

A further object is the provision of disk wings which extend through the tubular portion of the bowl member and provide internal and external wings.

Other important objects will become apparent to those skilled in this art as the disclosure is more fully made.

Briefly stated, the improved assembly mounting consists in the provision of a frusto-conical projection on a bowl pivot member and a correspondingly shaped recess in the end of the bowl spindle. In conventional separator assembly mountings, which allow the assembly to rock about its center of gravity, a frusto-conical projection is provided on the end of the spindle, and a correspondingly shaped recess, in the bowl member. According to this construction, the pivot point must always be above the center of gravity of the assembly. By providing the frusto-conical projection on the bowl member instead of the spindle, it is possible to pivot the assembly below the center of gravity and thus lower the bottom of the bowl.

Referring to the accompanying sheet of drawings—

Figure 1 is a sectional elevation through the bowl assembly, showing the details of the assembly and its mounting on a bowl spindle;

Figure 2 is a section taken on the line 2—2 of Figure 1, and shows the locating lug between the shell and the bowl member;

Figure 3 is a sectional detail of a modified form of rib construction; and,

Figure 4 is an enlarged section, showing the way in which the assembly is pivoted upon the spindle.

As shown in Figure 1, the numeral 10 designates the cream separator bowl assembly, which consists essentially of a bowl member 11, a bowl shell 12, and a stack of separator disks 13. The bowl member has a wide circular base 14 and a central, tubular portion 15 extending upwardly from the base. Over a flanged periphery 16 of the base, the shell 12 is sleeved. A sealing or packing ring 16' is provided between the shell and the periphery. A locating lug 17 is welded or otherwise joined to the inner edge of the shell and is normally positioned in a groove 18 in the flanged portion of the bowl member.

Four side outlets 19 are provided, equally spaced about the base of the tubular portion 15. Positioned on the base 14, adjacent the outlets 19, is a heavy, or transfer, disk 20. Two equally spaced, radially extending disk transfer wings 21, only one of which appears in the drawing, are welded or otherwise joined to the under side of the transfer disk. The separator disks 13 are positioned over the transfer disk. Diametrically opposed openings 22 in the transfer disk and openings 23 in the separator disks are provided. Three equally spaced, radially extending wings 24 are soldered in grooves in the exterior of the tubular portion 15 and fit in notches in the separator disks and transfer disk. One of the wings may conveniently be of larger size than the other two and fit into correspondingly larger notches of the transfer separator disks. This arrangement assures that the holes 22 and 23 in the disks will be kept in line and that, for the sake of proper balance, the disks will be assembled in only one way with respect to the bowl. The engagement of the wings and the notches incidentally provides a driving connection between the disks and the bowl member, although this is unnecessary, for the disks are ordinarily held against the base of the bowl member with sufficient compressive force for the establishment of a driving connection.

On top of the stack of separator disks 13, a dividing disk 25 is positioned. Four equally spaced wings 26, welded to the dividing disk, maintain it in spaced relation to the shell. The central upper portion of the dividing disk has cylindrical sections 27 and 29, a frusto-conical joining section 28, and an inwardly flanged edge 30. At the inner side of the cylindrical section 29 and the flanged edge 30, a locating ring 31 is secured by welding. This ring has a locating projection 32 which fits in a slot 33 in the upper end of the tubular portion 15 of the bowl member, and prevents the dividing disk from turning about the bowl member. Threaded into the upper end of the bowl shell 12 is a collar 34 having therein milk discharging openings 35 and 36. Threaded to the upper end of the tubular portion of the bowl member is a nut 37, which rests against the end of the collar 34 and holds the shell 12 in engagement with the flanged periphery 16 of the bowl member. In the upper end of the dividing disk 25 and in the collar 34, adjacent cream discharge openings 38 and 39 are provided.

The details of the novel mounting of the assembly upon the spindle will now be described. Special attention is directed to Figure 4 of the drawing, which shows the details on an enlarged scale.

Within a central opening 40 in the base of the bowl member, a bowl driver 41 is press-fitted. A bowl spindle 42 is loosely fitted within the driver and contains a slot 43, which receives a key 44 on the driver. A driving connection between the spindle and the bowl assembly is thus established. Soldered or otherwise secured to the driver is a bowl pivot 45, which closes the central opening in the bowl member. On the under-side of the bowl pivot is a frusto-conical projection 46, which fits into a similarly shaped frusto-conical portion 48 of a recess 47 in the end of the spindle. It will be seen from Figure 4 that the projection and recess contact over a narrow frusto-conical area. This, along with the loose fit of the spindle in the driver, allows a slight rocking of the bowl assembly and will permit the bowl to right itself in operation because of gyroscopic action at the high speeds of rotation.

Let us assume that the center of gravity of the assembly is at a point marked C. G. The recess and projection are so designed that a circle having as its center the center of gravity of the assembly is tangent to lines of contact between the projection and the recess. This circle is shown in dash-dot lines in Figure 4. Considered in three dimensions, this will be a sphere having its center at the center of gravity of the assembly and being tangent to the narrow frusto-conical area of contact between the projection and the recess. Thus, though a slight rocking of the assembly about the end of the spindle may occur, the center of gravity of the assembly will always remain in the same position on the axis of the spindle.

In a conventional type of mounting, wherein the conical projection is provided on the end of the spindle and a correspondingly shaped recess in the bowl pivot, the contact area must necessarily be above the center of gravity. This would, of course, raise the position of the pivot member above that shown in Figures 1 and 4. In these figures it will be noted that the position of the pivot member is relatively low, and in particular the upper surface of the pivot member, which is incidentally the inner surface of the assembly immediately adjacent the projection on the bowl pivot, is so low that it extends through the imaginary sphere to which the contacting portions of the recess 48 and projection 46 are tangent.

One advantage is that the low inner surface of the assembly affords direct access through and across the tubular portion 15 from one outlet 19 to another. Thus cleaning of the tubular portion and the outlets is facilitated. A second advantage is that access is had to the under side of the transfer disk 20 without the use of an auxiliary sleeve. More cream space is provided since with no auxiliary sleeve the disks have a smaller inside diameter and consequently more effectiveness for a given outside diameter.

The operation of the cream separator will now be described.

The assembly is brought to the proper speed of rotation through the spindle, and whole milk is poured down through the opening in the tubular portion and tends to rotate with the assembly. It passes radially outwardly, because of centrifugal action, through the outlets 19 and under the transfer disk 20. The transfer disk wings 21 increase its speed of rotation and the centrifugal force applied. It then rises through the openings 22 and 23 into the separator disks. Separation of the whole milk into cream and milk takes place under the centrifugal action. The cream, being lighter, tends to move inwardly and upwardly through the disks toward the outside of the tubular portion, the milk flowing outwardly down the disks toward the shell. The cream continues to be rotated by means of the wings 24 and rises, and is taken off through the openings 38 and 39. The milk passes into the cylindrical space between the disks and the shell and upwardly and inwardly in the space between the dividing disk 25 and the shell, and is finally taken off through openings 35 and 36 in the collar 34.

In large cream separators, it has been found that an insufficient speed of rotation is given to the whole milk in the tubular portion of the bowl member, and it does not flow out fast enough through the outlets, but tends to rise in the tubular portion. To counteract this, I have provided, as shown in the modification of Figure 3, wing members 24', which extend through radial slots in the tubular portion 15' and constitute not only external wings, but also internal wings. The internal wings effect a greater speed of rotation of the whole milk and thus eliminate its rising in the tubular portion.

From the disclosure it will be apparent that an improved cream separator bowl assembly mounting has been provided, as well as an improved wing attachment for the tubular portion of the bowl member, and means for locating the shell on the bowl member.

It is obvious that the assembly mounting is applicable to other types of bowl assemblies than that specifically shown in the drawing. It is the intention to cover all such changes and modifications of the example herein shown which do not depart from the spirit and scope of the invention as indicated by the following claims.

What is claimed as new is:

1. In a separator structure comprising a bowl having a base and a stack of separator disks supported on the base, a central tubular portion extending upwardly from the base through the disks and having peripheral outlets directly opposite the lowest disk of the stack, the inner surface of the base within the tubular portion being disposed at a level to allow direct access through and across the tubular portion from one peripheral outlet to another; the combination with said inner surface of a downwardly extended projection on the under side of the base, and a driving spindle having a recess of a shape to conform with the projection on the underside of the base to receive and engage the projection, the engaging portions of the projection and the recess being substantially tangent to an imaginary sphere having its center coincident with the center of gravity of the bowl, such engaging portions being disposed within the confines of the bowl.

2. In a separator structure comprising a bowl having a base and a stack of separator disks supported on the base, a central tubular portion extending upwardly from the base through the disks and having peripheral outlets directly opposite the lowest disk of the stack, the inner surface of the base within the tubular portion being disposed at a level to allow direct access through and across the tubular portion from one peripheral outlet to another; the combination with said inner surface of a downwardly extended frustro-conical projection on the under side of the base, and a spindle extending within said recess for supporting and driving the bowl and having a frustro-conical recess engaging the projection, the engaging portions of the projection and recess being substantially tangent to an imaginary sphere having its center coincident with the center of gravity of the bowl.

WILLIAM H. HARSTICK.